United States Patent
Powers et al.

(10) Patent No.: US 6,859,172 B2
(45) Date of Patent: Feb. 22, 2005

(54) SYSTEM AND METHOD FOR LOCATING A MOBILE PHONE

(75) Inventors: Michael W. Powers, Lubbock, TX (US); Sam D. Sorensen, Lubbock, TX (US); Chuck C. Williams, The Colony, TX (US); John W. Walter, Lubbock, TX (US); Adam V. Behnke, Lubbock, TX (US)

(73) Assignee: Global Business Software Development Technologies, Inc., Lubbock, TX (US)

(*) Notice: Subject to any disclaimer, the term of this patent is extended or adjusted under 35 U.S.C. 154(b) by 0 days.

(21) Appl. No.: 10/368,898

(22) Filed: Feb. 17, 2003

(65) Prior Publication Data

US 2004/0160363 A1 Aug. 19, 2004

(51) Int. Cl.[7] .............................. G01S 5/02; G01S 3/02; H04Q 7/20
(52) U.S. Cl. ....................... 342/430; 342/422; 342/465; 455/456.2
(58) Field of Search ................................. 342/430, 422, 342/457, 465, 463, 372, 371, 4.3; 455/456.2, 456.5

(56) References Cited

U.S. PATENT DOCUMENTS

| | | | | |
|---|---|---|---|---|
| 5,485,163 A | | 1/1996 | Singer et al. | 342/457 |
| 5,844,522 A | * | 12/1998 | Sheffer et al. | 342/457 |
| 5,973,643 A | | 10/1999 | Hawkes et al. | 342/457 |
| 6,021,330 A | * | 2/2000 | Vannucci | 455/456.2 |
| 6,047,192 A | | 4/2000 | Maloney et al. | 455/456 |
| 6,088,594 A | * | 7/2000 | Kingdon et al. | 455/457 |
| 6,141,558 A | | 10/2000 | Chen | 455/456 |
| 6,163,696 A | | 12/2000 | Bi et al. | 455/436 |
| 6,256,489 B1 | | 7/2001 | Lichter et al. | 455/404 |
| 6,288,676 B1 | | 9/2001 | Maloney | 342/457 |
| 6,289,211 B1 | | 9/2001 | Koorapaty et al. | 455/404 |
| 6,421,009 B2 | | 7/2002 | Suprunov | 342/465 |
| 6,424,837 B1 | | 7/2002 | Hall et al. | 455/456 |
| 6,563,910 B2 | * | 5/2003 | Menard et al. | 379/45 |
| 2002/0005804 A1 | | 1/2002 | Suprunov | 342/457 |
| 2002/0077115 A1 | | 6/2002 | Ruutu et al. | 455/456 |
| 2002/0102995 A1 | | 8/2002 | Zelmanovich et al. | 455/456 |
| 2002/0128020 A1 | | 9/2002 | Carlson et al. | 455/456 |

FOREIGN PATENT DOCUMENTS

| | | | |
|---|---|---|---|
| DE | 44 21 227 A1 | 12/1995 | H04B/7/26 |
| DE | 199 14 380 A1 | 10/2000 | G01S/1/66 |
| EP | 0 756 430 A2 | 1/1997 | H04Q/7/30 |

OTHER PUBLICATIONS

S.C. Swales et al., Locating mobile phones and the US wireless E–911 mandate, IEE Colloquium on Novel Methods of Locatio and Tracking of Cellular Mobiles and Their System Applications, p. 2/1–2/6, May 1999.*

T.S. Rappaport et al., Position location using wireless communications on highways of the future, IEEE Communications Magazine, vol. 34(10), p. 33–41, Oct. 1996.*

M. Birchler, E911 Phase 2 Location Solution Landscape, http://www.fcc.gov/911/enhanced/releases/mottutorial.pdf, Jun. 1999.*

Koshima et al., "Personal Locater Services Emerge," *IEEE Spectrum*, Feb. 2000, 8 pages.

International Search Report in International Application No. PCT/US2004/004289, dated Jul. 15, 2004, 8 pages.

* cited by examiner

Primary Examiner—Bernarr E. Gregory
Assistant Examiner—F H Mull
(74) Attorney, Agent, or Firm—Baker Botts L.L.P.

(57) ABSTRACT

A system includes antenna control stations and a system interface. Each antenna control stations directs an orientation of an associated antenna to search for an identification signal associated with a mobile phone. The antenna control station communicates a detection response describing the orientation of the associated antenna. The system interface computes the location of the mobile phone based on the detection responses received from the antenna control stations.

52 Claims, 4 Drawing Sheets

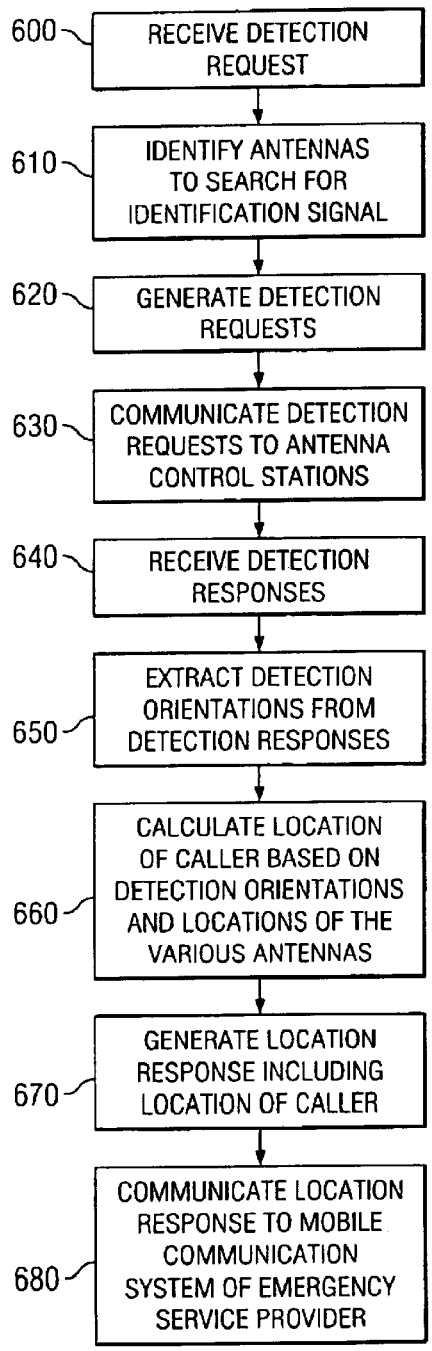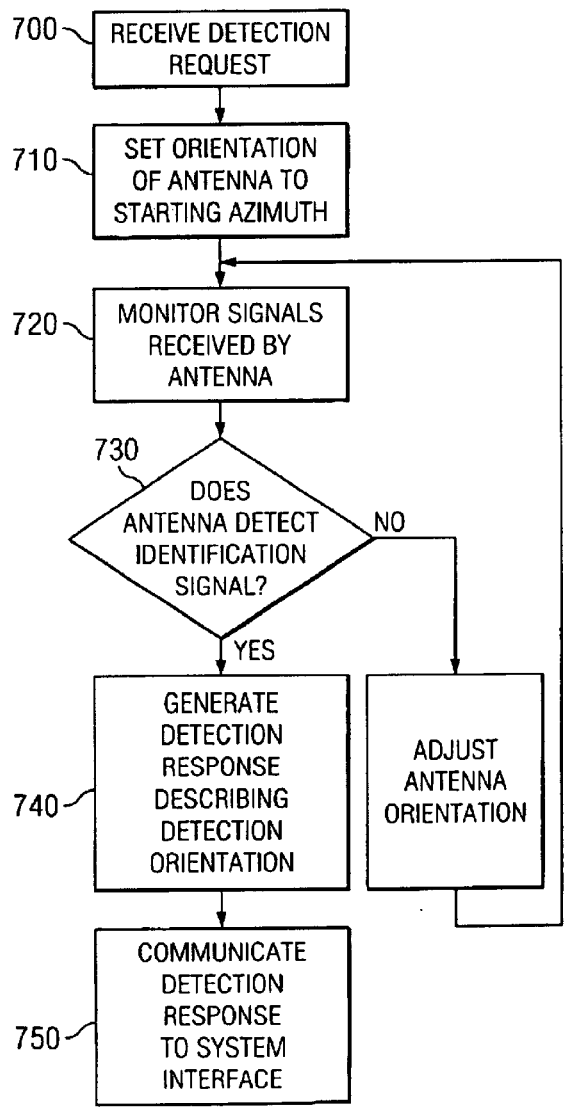

SYSTEM AND METHOD FOR LOCATING A MOBILE PHONE

TECHNICAL FIELD OF THE INVENTION

This invention relates in general to mobile phones, and more particularly to locating mobile phones.

BACKGROUND OF THE INVENTION

Mobile phone use has increased rapidly over the past decade. Mobile phones offer not only convenience but also significant safety benefits by providing stranded motorists, pedestrians, and other individuals separated from conventional landline phones with the ability to contact emergency service providers if needed.

However, unlike conventional landline phones, mobile phones do not provide emergency service providers with information indicating where the caller is located. This is often critical for emergency providers as the caller may become incapacitated during the call, disconnected, or otherwise prevented from supplying the emergency service provider with this information. The need for this information is only amplified in the case of mobile phones as the mobile caller may not actually know his or her whereabouts. Consequently, emergency service providers may be unable to assist the mobile caller.

Some solutions to this problem have been attempted utilizing the Global Positioning System (GPS), a network of satellites capable of locating objects on the surface of the earth. However, GPS solutions are undesirable for a number of reasons. A primary drawback is the fact that GPS solutions require an unimpeded line-of-sight between a GPS satellite and the mobile phone. Thus, a GPS-based system will be unable to locate a mobile phone user calling from within a building.

Therefore, a system is desired that is capable of determining the location of a caller communicating with an emergency service provider using a mobile phone.

SUMMARY OF THE INVENTION

From the foregoing, it may be appreciated by those skilled in the art that a need has arisen for a method of locating a caller using a mobile phone. In accordance with the present invention, the disadvantages and problems associated mobile phones have been substantially reduced or eliminated. In particular, the present invention provides a system and method for locating a mobile phone using directional antennas.

In accordance with one embodiment of the present invention, a method for determining the location of a mobile phone comprises receiving a location request including an identification signal associated with a mobile phone, receiving one or more detection responses, each detection response including an orientation at which a directional antenna detects the identification signal; and determining a location of the mobile phone based on the detection responses.

In accordance with another embodiment of the present invention, a system for locating a mobile phone, comprises a plurality of antenna control stations, each antenna control station associated with an antenna and each antenna control station operable to adjust an orientation of the associated antenna, to determine whether the associated antenna detects an identification signal associated with a mobile phone at the present orientation of the associated antenna, and to communicate a detection response describing the orientation of the associated antenna when the associated antenna detects the identification signal; and a system interface operable to compute the location of the mobile phone based on the detection responses received from the antenna control stations.

Important technical advantages of certain embodiments of the present invention include determining the location of a caller independent of the communication system on which the caller is communicating. Other important technical advantages of certain embodiments of the present invention include the ability to locate a caller absent a clear line-of-site path to the caller, the ability to locate callers on multiple communication systems, and the ability to locate callers with increased precision.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 6 is a flow chart illustrating the operation of a system interface in accordance with one embodiment of the present invention; and FIG. 7 is a flow chart illustrating the operation of an antenna control station in accordance with one embodiment of the present invention.

DETAILED DESCRIPTION OF THE INVENTION

Figure 1:
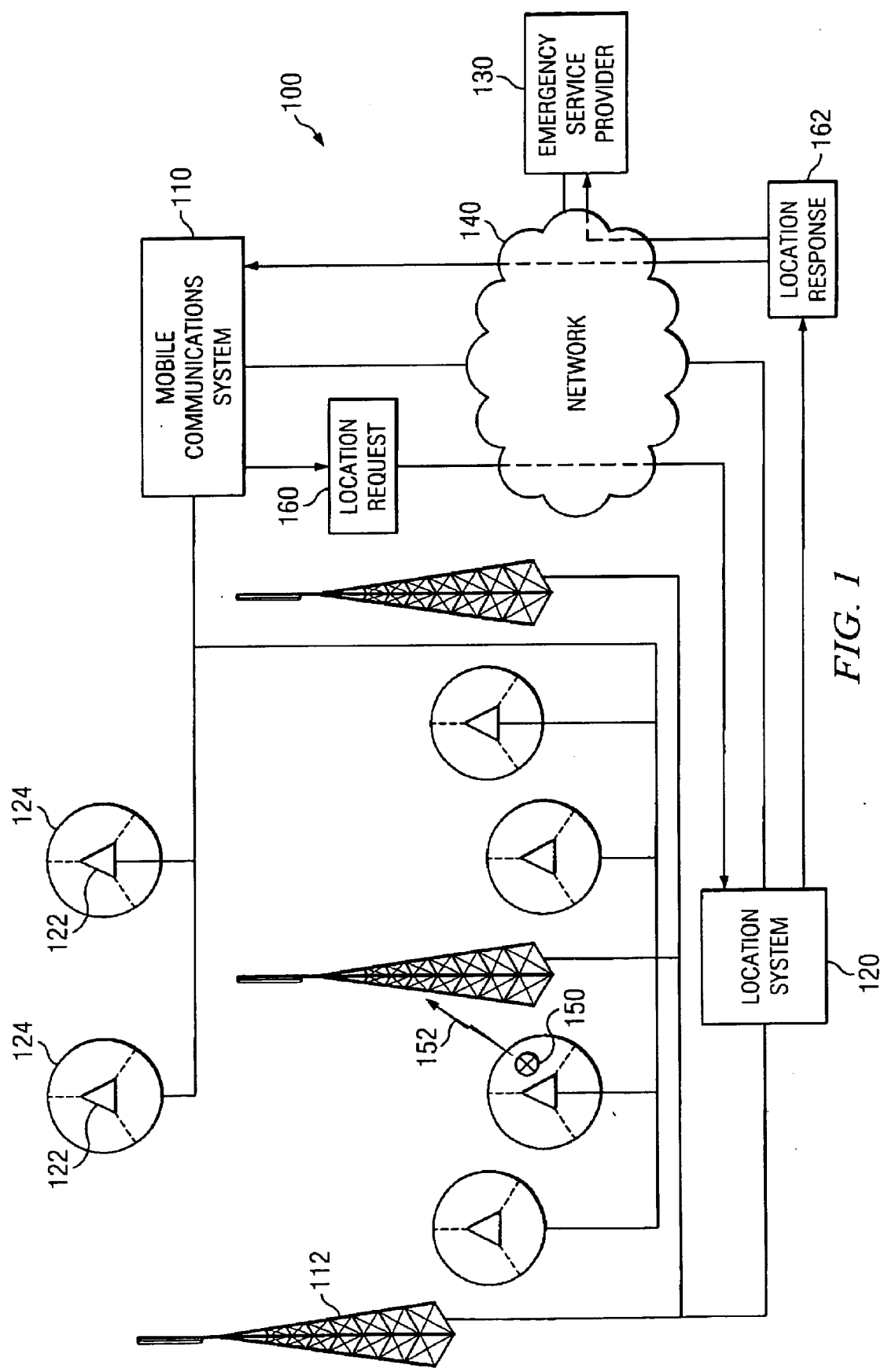
FIG. 1 illustrates a mobile communication system, a caller, and a location system according to one embodiment of the present invention.

FIG. 1 illustrates a system 100. System 100 includes a mobile communication system 110, a location system 120, and an emergency service provider 130 coupled together by a network 140. FIG. 1 also includes antennas 112, cell towers 122 and a mobile phone 150. Location system 120 uses directional antennas 112 to determine the location of mobile phone 150 receiving communication service from mobile communication system 110.

Mobile phone 150 is a mobile communication device being used by a caller attempting to contact emergency service provider 130 through mobile communication system 110. Examples of mobile phone 150 include cellular phones, personal digital assistants ("PDAs"), laptop computers and any other portable devices which may be used to contact emergency service provider 130 through mobile communication system 110.

Mobile communication system 110 provides conventional mobile communication service to mobile phone 150. If mobile communication system 110 receives a communication signal from mobile phone 150 requesting emergency service, mobile communication system 110 communicates information identifying the mobile phone 150 to location system 120 in the form of a location request 160. Mobile communication system 110 may include any combination of hardware and/or software suitable to implement the functionality as described. Although system 100 includes a single mobile communication system 110, particular embodiments of system 100 may contain any number of mobile communication systems 110 in communication with location system 120.

Location system 120 locates an identification signal associated with mobile phone 150 and communicates the location to emergency service provider 130 or mobile communication system 110 in the form of a location response 162. Location system 120 may include any suitable combination of hardware and/or software suitable to implement the functionality as described.

Location system 120 may be independent from mobile communication system 110. Examples of independence may include: the ability of location system 120 to communicate with a particular mobile communication system 110 without regard for the protocols used internally by the mobile communication system 110; the ability of location system 120 to communicate with multiple mobile communication systems 110; the ability of location system 120 to itself determine the location of particular antennas 112; the fact that location system 120 does not include any of the components of mobile communication system 110; or any other suitable form of operational or physical independence. Moreover, the independence of location system 120 contemplates passive operation in which no changes need be made to the wireless infrastructure of mobile communication system 110.

Emergency service provider 130 is a person, group of people, or entity responsible for providing services to a caller using mobile phone 150. Emergency service provider 130 may represent a police or fire department, a roadside-assistance service provider, a wilderness rescue unit or the provider of any other services which may require the service provider to determine the location of a caller using mobile phone 150. Although system 100 includes a single emergency service provider 130, particular embodiments of system 100 may contain any number of emergency service providers 130.

Network 140 may represent any hardware and/or software configured to communicate information in the form of packets, cells, frames, segments or other portions of data. Network 140 may include routers, hubs, switches, gateways, or any other suitable component to any suitable form or arrangement. In general, network 140 may comprise any combination of public or private communication equipment such as elements of a public switched telephone network (PSTN), a global computer network such as the internet, a local area network (LAN), a wide-area network (WAN), or other appropriate communication equipment. Network 140 may represent a single network or any combination of separate networks independently connecting mobile communication system 110, location system 120, and emergency service provider 130.

Cell towers 122 represent conventional mobile communication towers for receiving mobile communication from mobile phone 150. Each cell tower 122 is capable of receiving calls from a limited, adjacent area that is divided into a plurality of cell sectors 124. Cell tower 122 receives mobile communication signals from mobile phone 150 and communicates the mobile communication signals to mobile communication system 110. Cell towers 122 may implement any form of wireless communication technology or protocols, including TDMA, FDMA, CDMA, GSM or any other suitable analog or digital communication technique in any single or combination of frequency bands.

Antennas 112 are narrow-beam, directional antennas capable of detecting mobile communication signals at the frequencies used by mobile communication system 110. Location system 120 manipulates antenna 112 to search for mobile phone 150. Each antenna 112 detects mobile communication signals from mobile phones located substantially in front of antenna 112 based on the current orientation of antenna 112. Location system 120 may steer antennas 112 mechanically. In a particular embodiment, location system 120 may steer antennas 112 using any suitable combination of motors, controllers, and control software. Location system 120 may also include electronically steered antennas 112 that incorporate beam forming networks, sectored elements, radiofrequency components, and/or signal processing software to resolve an angular direction to mobile phone 150.

In operation, a cell tower 122 receives a mobile communication signal from mobile phone 150 requesting service from emergency service provider 130. Mobile phone 150 is located in a particular cell sector 124 associated with the particular cell tower 122. Cell tower 122 transmits the mobile communication signal to mobile communication system 110.

Based on information contained in the mobile communication signal, mobile communication system 110 generates location request 160 which includes an identification signal 152 identifying the mobile phone 150 to be located. Identification signal 152 may carry a mobile identification number (MIN), electronic serial number (ESN), or any other information uniquely associated with mobile phone 150. Location request 160 also may include information identifying the channel on which mobile phone 150 is communicating and other information describing the type of mobile phone 150, the manner in which mobile phone 150 is communicating, or any other information useful for locating mobile phone 150. Moreover, the contents and format of location request 160 in a particular embodiment of system 100 may vary depending on the particular mobile communication system 110 and cell tower 122 communicating with mobile phone 150.

Additionally, location request 160 may include information describing an approximate location of mobile phone 150 and, if system 100 includes more than one mobile communication system 110, information identifying the mobile communication system 110 making the request. Mobile communication system 110 communicates location request 160 to location system 120 through network 140.

Using information provided in location request 160, location system 120 identifies one or more antennas 112 to search for identification signal 152 associated with mobile phone 150. In a particular embodiment of system 100, location system 120 calculates an approximate location of mobile phone 150 based on information included in location request 160. Identified antennas 112 then use the approximate location as a starting point for their search.

Location system 120 manipulates the identified antennas 112, mechanically or electronically, to detect identification signal 152. Location system 120 then determines the location of mobile phone 150 based on the location and orientation of each identified antenna 112 that detects identification signal 152.

After determining the location of mobile phone 150, location system 120 generates location response 162 which includes information describing the location of mobile phone 150. In a particular embodiment of system 100, location system 120 communicates location response 162 to emergency service provider 130 through network 140. Alternatively, location system 120 may communicate location response 162 to mobile communication system 110 through network 140. Mobile communication system 110 is then responsible for communicating the location of mobile phone 150 to emergency service provider 130.

Figure 2:
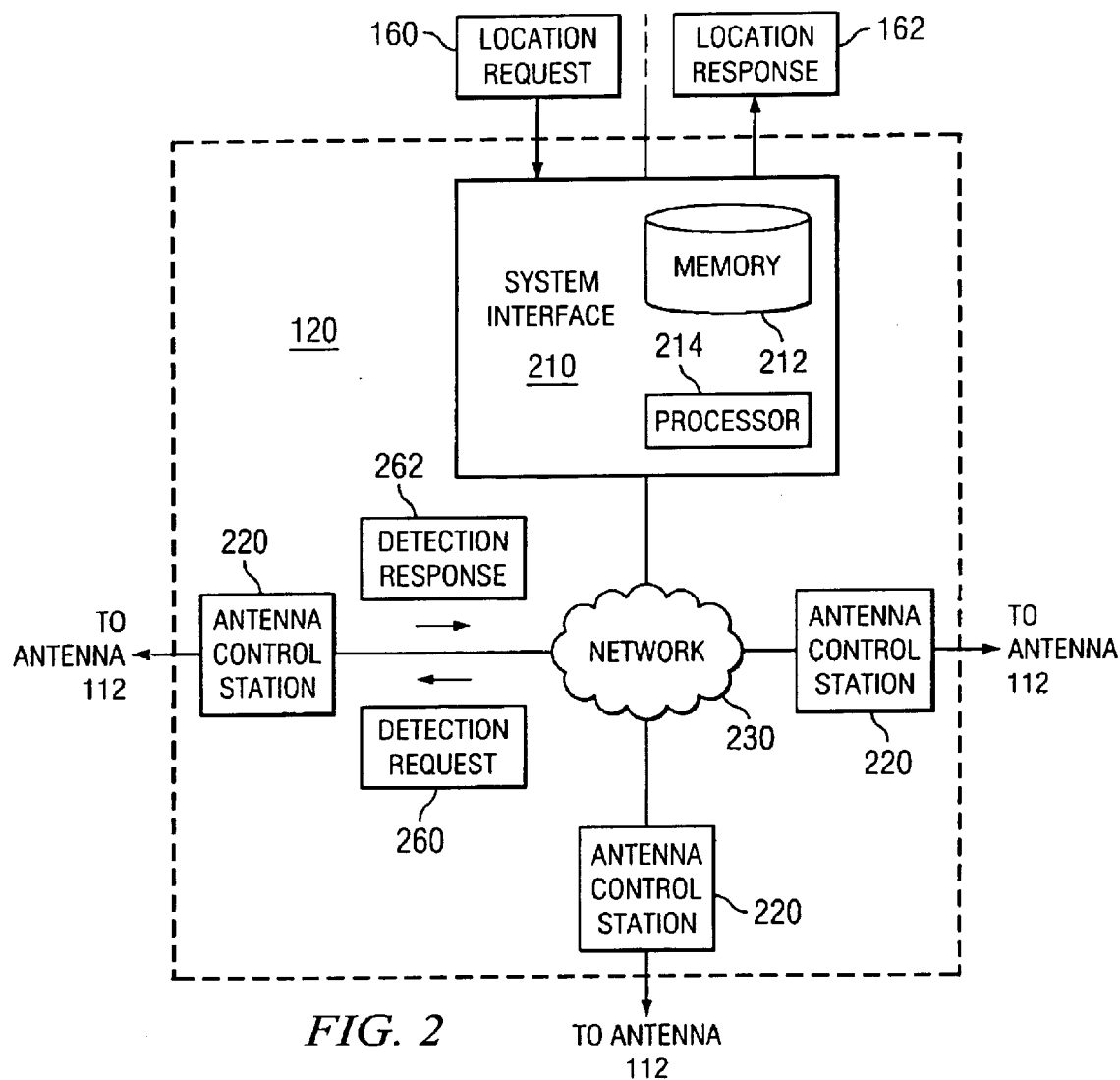
FIG. 2 is a block diagram illustrating the contents and operation of the location system.

FIG. 2 is a block diagram illustrating the contents and operation of location system 120 according to a particular embodiment of system 100. Location system 120 includes system interface 210, multiple antenna control stations 220, and network 230. Network 230 connects system interface 210 to antenna control stations 220.

System interface 210 facilitates communication between location system 120 and mobile communication system 110. System interface 210 also identifies antennas 112 for location system 120 to use in searching for mobile phone 150 and processes the results of the search to determine the location of mobile phone 150.

System interface 210 may include a memory 212 and a processor 214. Memory 212 may hold the locations of antennas 112, locations of cell sectors 124, channel descriptions, phone numbers for emergency service providers 130, or any other information pertaining to the components of system 100 or mobile phone 150. Additionally, memory 212 may hold code to be executed by processor 214. Memory 212 may include any collection and arrangement of volatile or non-volatile, local or remote devices suitable for storing data, such as for example random access memory (RAM) devices, read only memory (ROM) devices, magnetic storage devices, optical storage devices, or any other suitable data storage devices.

Processor 214 identifies antennas 112, computes the location of mobile phone 150 and provides other computational functionality that may be used by system interface 210. Processor 214 may be a general purpose computer, dedicated microprocessor, or any other suitable processing device. Examples of processor 214 include application-specific integrated circuits (ASICs), field-programmable gate arrays (FPGAs), digital signal processors (DSPs) and any other suitable specific or general purpose processors.

Antenna control stations 220 manipulate antennas 112 to detect identification signal 152. Each antenna control station 220 then communicates information describing the bearing at which the antenna 112 associated with the particular antenna control station 220 detected identification signal 152. Antenna control stations 220 may be either physically distinct from or integrated with system interface 210 and may include any combination of hardware and/or software as need to implement the functionality as described. Additionally, the antenna control stations 220 associated with multiple antennas 112 may be integrated into a single physical component.

Network 230 may represent any hardware and/or software configured to communicate information in the form of packets, cells, frames, segments or other portions of data. Network 230 may include routers, hubs, switches, gateways, or any other suitable component to any suitable form or arrangement. In general, network 230 may comprise any combination of public or private communication equipment such as elements of a public switched telephone network (PSTN), a global computer network such as the internet, a local area network (LAN), a wide-area network (WAN), or other appropriate communication equipment. Network 230 may represent a single network or any combination of separate networks independently connecting mobile communication system 110, location system 120 and emergency service provider 130. Additionally, network 230 may represent the same network as network 140.

In operation, system interface 210 receives location request 160 from communication system 120. Location request 160 may include information identifying the broad geographic area in which mobile phone 150 is located. For example, location request 160 may include information identifying a particular cell tower 122 and associated cell sector 124 of mobile communication system 110.

System interface 210 then identifies a number of antenna control stations 220 to send a detection request 260. The identified antenna control stations 220 may represent any or all antenna control stations 220 in location system 120 depending upon the characteristics and/or requirements of system 100 and the location of mobile phone 150.

For example, location system 120 may couple to a large number of antennas 112 spread across an expansive geographic area. System interface 210 may then identify a subset of the antennas 112 as being closest to mobile phone 150 by using approximate location information included in location request 160, by referencing a database containing geographic or other information about various mobile communication systems 110, or in any other appropriate manner. System interface 210 then communicates detection request 260 to the antenna control stations 220 associated with the identified antennas 112. Alternatively, location system 120 may couple to only a small number of antennas 112 located in close proximity to one another, all of which are used to locate mobile phone 150.

Additionally, system interface 210 may process approximate location information received in location request 160 to produce antenna-specific search parameters for each of identified antennas 112. System interface 210 includes the search parameters for a particular identified antenna 112 in the detection request 260 sent to the antenna station 220 associated with the identified antenna 112.

For example, in a particular embodiment of system 100, location request 160 includes information identifying a particular cell tower 122 which received a call from mobile phone 150 and the cell sector 124 from which the call was received. System interface 210 identifies a number of antennas 112 near the particular cell tower 122 and cell sector 124. For each of the identified antennas 112, system interface 210 calculates a starting azimuth at which the particular antenna 112 would face cell sector 124. System interface 210 then includes the starting azimuth in the detection request 260 sent to the antenna control station 220 associated with the particular identified antenna 112.

Upon receiving detection requests 260, each antenna control station 220 associated with an identified antenna 112, manipulates the associated antenna 112 to detect identification signal 152. These antenna control stations 220 then communicate to system interface 210 detection responses 262 that include information describing the location of mobile phone 150 in terms of the orientation, location or other characteristics of the identified antennas 112.

After receiving detection responses 262 from antenna control stations 220 associated with identified antennas 112, system interface 210 uses the information provided in the various detection responses 262 to calculate the location of mobile phone 150. In a particular embodiment of system 100, this includes triangulating the location of mobile phone 150 using the location and detection orientations of each of identified antennas 112.

System interface 210 generates a location response 162 including information describing the location of mobile phone 150 and communicates the location response 162 to either mobile communication system 110 or emergency service provider 130. Location response 162 may include any suitable description of the location of mobile phone 150 including, but not limited to, the latitude and longitude of mobile phone 150, information describing the location of mobile phone 150 relative to a fixed geographic point of reference, and driving directions to mobile phone 150 from the location of emergency service provider 130.

Figure 3:
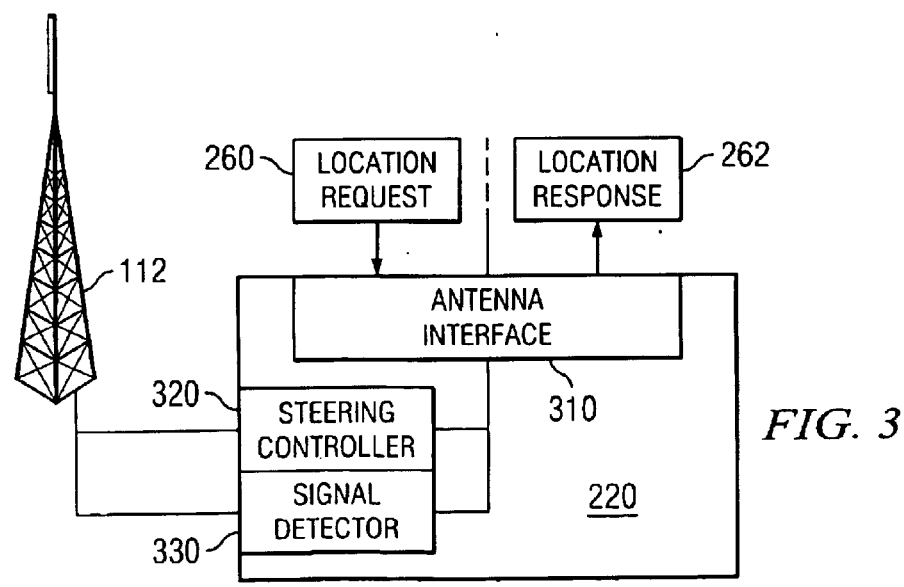
FIG. 3 is a block diagram illustrating the contents and operation of an antenna station.

FIG. 3 is a block diagram showing the contents and operation of antenna control station 220 according to a particular embodiment of system 100. Antenna control station 220 includes an antenna interface 310, a steering controller 320, and a signal detector 330. Additionally, each antenna control station 220 is associated with a particular antenna 112 and is capable of adjusting the orientation of the associated antenna 112 and processing signals received by associated antenna 112.

Antenna interface 310 facilitates communication between antenna control station 220 and system interface 210. Antenna interface 310 may comprise logic encoded in media for carrying out functions of the system. The logic comprises functional instructions for carrying out programmed tasks. The media comprises computer disks or other suitable computer-readable media, application-specific integrated circuits (ASICs), field-programmable gate arrays (FPGAs), digital signal processors (DSPs) or other suitable specific or general purpose processors, transmission media or other suitable media in which logic may be encoded and utilized.

Steering controller 320 adjusts the orientation of associated antenna 112 and communicates the orientation of associated antenna 112 to antenna interface 310 for use in detection response 262. In a particular, embodiment of antenna control station 220, steering controller couples to and controls a servo motor. The servo motor is located on associated antenna 112 and directs associated antenna 112. Alternatively, steering controller 320 may represent components for electronically steering associated antenna 112. In general, steering controller 320 may represent any combination of software and/or hardware suitable to implement the functionality as described.

Signal detector 330 receives information identifying identification signal 152. Signal detector 330 may also receive information identifying a channel, frequency, and/or protocol, or any additional information useful for detecting identification signal 152. Signal detector 330 determines whether associated antenna 112 has detected identification signal 152. Signal detector 330 communicates the detection of identification signal 152 to antenna interface 310. Signal detector 330 may represent any combination of software and/or hardware suitable to implement the functionality as described.

In operation, antenna interface 310 receives detection request 260 from system interface 210 which includes information identifying identification signal 152. In a particular embodiment, detection request 260 also includes a starting azimuth for associated antenna 112. Antenna interface 310 communicates the information identifying identification signal 152 to signal detector 330. Antenna interface 310 may additionally communicate a starting azimuth to steering controller 320, if so steering controller 320 directs associated antenna 112 to the starting azimuth.

Steering controller 320 then directs associated antenna 112 using any combination of coarse- and/or fine-grain search algorithms. Signal detector 330 monitors all signals received by associated antenna 112 during rotation. When signal detector 330 detects identification signal 152, steering controller 320 then determines the orientation of associated antenna 112. Steering controller 320 communicates information describing the detection orientation to antenna interface 310. In a particular embodiment of antenna control station 220, this information includes an angular azimuth. Antenna interface 310 generates a detection response 262 including information describing the detection orientation and communicates detection response 262 to system interface 210.

Figure 4A:
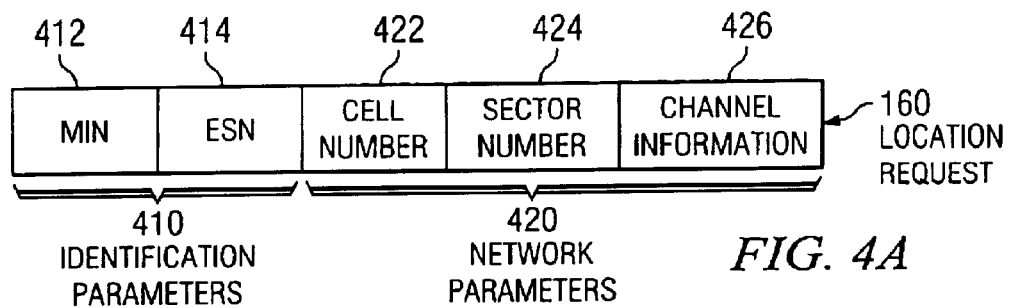
FIG. 4A illustrates a location request according to one embodiment of the present invention.

FIG. 4A illustrates contents of a location request 160 according to a particular embodiment of system 100. Location request 160 includes identification parameters 410 and network parameters 420. Identification parameters 410 provide information describing the particular mobile phone 150 for which emergency service provider 130 is seeking a location. Thus, identification parameters 410 also identify the identification signal 152 sought by location system 120. Identification parameters 410 may include information utilized by conventional mobile communication systems, such as a mobile identification number (MIN) 412 and an electronic serial number (ESN) 414, or any other suitable information by which location system 120 can determine the identification signal 152 associated with the mobile phone 150 in question.

Network parameters 420 provide information defining where and how location system 120 should search for identification signal 152. For example, network parameters 420 may indicate an approximate location of mobile phone 150, the channel on which mobile phone 150 is communicating, the frequency at which mobile phone 150 is communicating, the wireless communication protocol, or any other information necessary for or helpful to limit the scope of the search to be conducted by location system 120. Additionally, if system 100 includes multiple mobile communication systems 110, network parameters 420 may include information identifying the particular mobile system 100 that sent location request 160.

In a particular embodiment, network parameters 420 include a cell number 422 identifying the cell tower 122 of mobile communication system 110 that is in communication with mobile phone 150; a sector number 424, identifying the cell sector 124 in which cell tower 122 received the communication from mobile phone 150; and channel information 426, identifying the channel of mobile communication system 110 on which mobile phone 150 is communicating.

Figure 4B:
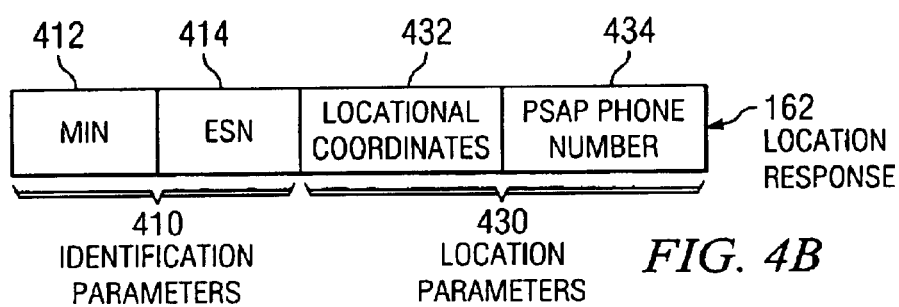
FIG. 4B illustrates a location response according to one embodiment of the present invention.

FIG. 4B illustrates the contents of location response 162. Location response 162 provides location information for mobile phone 150 to mobile communication system 110 or emergency service provider 130. Location response 162 includes identification parameters 410 and location parameters 430. Identification parameters 410 in location response 162 may be identical to identification parameters 410 in location request 160. However, for purposes of formatting, to facilitate integration, or for any other suitable reason, identification parameters 410 may be modified from identification parameters 410. In a particular embodiment of system 100, identification parameter 410 in location response 162 include MIN 412 and ESN 414.

Location parameters 430 include information describing the location of mobile phone 150. In a particular embodiment of system 100, location parameters 430 include locational coordinates 432, representing a latitudinal and longitudinal description of the location of mobile phone 150, and the phone number of the nearest emergency service provider 130 to locational coordinates 432, PSAP phone number 434. In this embodiment, PSAP phone number 434 may be used by mobile communication system 110 to identify and contact the most appropriate emergency service provider 130.

Figure 5A:
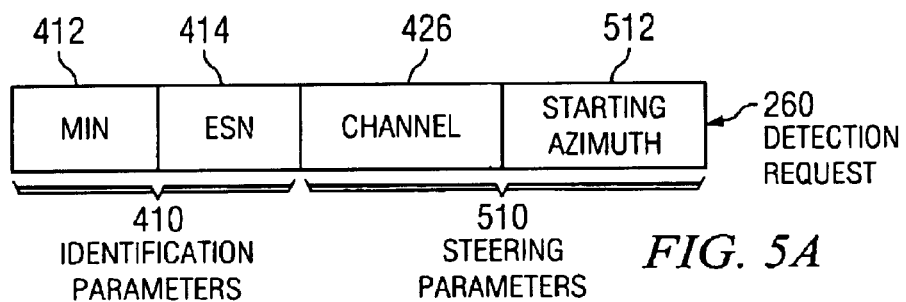
FIG. 5A illustrates a detection request according to one embodiment of the present invention.

FIG. 5A illustrates the contents of detection request 260 according to a particular embodiment of system 100. Detection request 260 may include identification parameters 410 and steering parameters 510. Identification parameters 410 identify the identification signal 152 to be located. Identification parameters 410 may be identical to identification parameters 410 and/or identification 410, but may be altered for purposes of formatting, to facilitate integration, or for any other suitable reason.

Steering parameters 510 provide antenna control station 220 with information necessary or helpful to detecting identification signal 152. In a particular embodiment of detection request 260, steering request 260 identifies the channel on which mobile phone 150 is communicating and a starting azimuth 512 at which the antenna control station 220 and associated antenna 112 should begin searching.

Figure 5B:
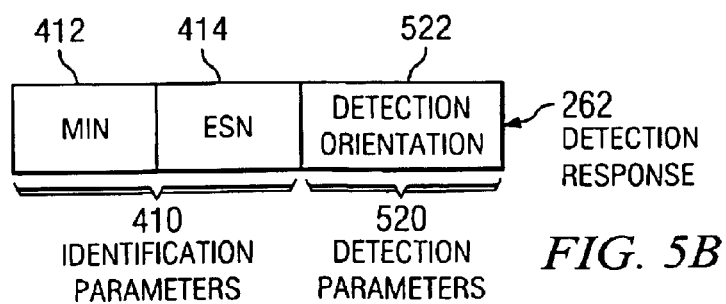
FIG. 5B illustrates a detection response according to one embodiment of the present invention.

FIG. 5B illustrates the contents of detection response 262 according to a particular embodiment. Detection response 262 includes identification parameters 410 and detection parameters 520. Identification parameters 410 allow system interface 210 to determine the particular mobile phone 150 to which detection response 262 applies. Identification parameters 410 in detection response 262 may be identical to identification parameters 410 in detection request 260. However, for purposes of formatting, to facilitate integration, or for any other suitable reason, identification parameters 410 in detection response 262 may be modified from identification parameters 410 in detection response 260.

Detection parameters 520 provide information describing the location of mobile phone 150 relative to the antenna 112 associated with the particular antenna control station 220 that generated the detection response 262. In FIG. 5B, detection parameters 520 include detection orientation 522. Detection orientation 522 represents an angular measurement of the azimuth at which the antenna 112 associated with this particular antenna control station 220 detected identification signal 152.

FIG. 6 is a flow chart diagramming the steps by which system interface 210 executes a location request 160 received from mobile communication system 110 in a particular embodiment of system 100. At step 600, system interface 210 receives a detection request 260 from mobile communication system 110 including identification signal 152 associated with mobile phone 150 requesting emergency services. At step 610, system interface 210 identifies a number of antennas 112 to use in searching for identification signal 152.

At step 620, system interface 210 generates detection requests 260 for each of identified antennas 112. System interface 210 communicates detection requests 260 to the antenna control station 220 associated with each of the identified antennas 112 at step 630.

Each of the identified antennas 112 locates mobile phone 150 by detecting identification signal 152. Antenna control stations 220 associated with each of the identified antennas 112 determine the detection orientation at which the associated antenna 112 detected identification signal 152. Antenna control station 220 communicates a detection response 262 including the detection orientation 432 to system interface 210. At step 640, system interface 210 receives detection responses 262 from all the antenna control stations 220 of all of the identified antennas 112.

At step 650, system interface 210 references the detection orientations 432 included in the various detection responses 262. Based on the locations of the various antennas 112 and their detection orientations 432, system interface 210 calculates the location of mobile phone 150 at step 660. At step 670, system interface 210 generates a location response 162 that includes locational coordinates 432 describing the location of mobile phone 150. System interface 210 communicates the location response 162 to mobile communication system 110 or emergency service provider 130 at step 680.

FIG. 7 is a flow chart diagramming the steps by which antenna control station 220 executes a detection request 260 received from system interface 210 in a particular embodiment of location system 120. At step 700, antenna control station 220 receives a detection request 260 which may include identification signal 152 and a starting azimuth 512. At step 710, antenna control station 220 sets the orientation of associated antenna 112 so that associated antenna faces the azimuth indicated by starting azimuth 512.

Antenna control station 220 monitors the signals received by associated antenna 112 at step 720. At step 730, antenna control station 220 determines whether associated antenna 112 detects identification signal 152 at its current orientation. If not, antenna control station 220 adjusts the orientation of associated antennas 112 at step 740 and continues to monitor the signals received at step 720.

If associated antenna 112 does detect identification signal 152 at its current orientation, antenna control station 220 generates detection response 262 describing the detection orientation of associated antenna 112 at step 750. At step 760, antenna control station 220 communicates detection response 262 to system interface 210 to be used in determining the location of mobile phone 150.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for determining the location of a mobile phone, comprising:

receiving a location request from a mobile communication system, the location request including an identification signal associated with a mobile phone and an approximate location of the mobile phone;

receiving one or more detection responses, each detection response including an orientation at which a directional antenna detects the identification signal;

determining a location of the mobile phone independent of the mobile communication system based on the detection responses;

identifying one or more directional antennas from a plurality of directional antennas;

calculating an initial orientation for each of the identified directional antennas based on the approximate location of the mobile phone; and communicating to each of the identified directional antennas the initial orientation calculated for that particular identified directional antenna.

2. The method of claim 1, wherein the detection response comprises an angular azimuth.

3. The method of claim 1, wherein:
one or more directional antennas comprises three directional antennas; and
determining a location comprises triangulating the location based on the location of each of the directional antennas and the orientation of each of the directional antennas.

4. The method of claim 1, wherein the location request identifies one of a plurality of mobile communication networks, and further comprising:
generating a location response including the location of the mobile phone; and
communicating the location response to the identified mobile communication network.

5. The method of claim 4, wherein the location response comprises a latitude and a longitude associated with the mobile phone.

6. The method of claim 4, wherein the location response comprises directions for driving from a predetermined location to the location of the mobile phone.

7. A method for determining the location of a mobile phone, comprising:
receiving a detection request identifying an identification signal associated with a mobile phone, the detection request comprising an initial orientation for a directional antenna;
setting an orientation of the directional antenna based on the initial orientation;
directing the directional antenna to detect the identification signal;
determining an orientation of the directional antenna when the identification signal is detected; and
communicating the orientation to a remote location for determining the location of the mobile phone.

8. The method of claim 7, wherein communicating the orientation comprises communicating an angular azimuth.

9. The method of claim 7, wherein directing a directional antenna comprises mechanically steering the directional antenna.

10. The method of claim 7, wherein directing a directional antenna comprises electronically steering the directional antenna.

11. A system for locating a mobile phone, comprising:
a plurality of antenna control stations, each antenna control station associated with an antenna and each antenna control station operable to:
direct an orientation of the associated antenna;
determine whether the associated antenna detects an identification signal associated with a mobile phone at the present orientation of the associated antenna; and
communicate a detection response describing the orientation of the associated antenna when the associated antenna detects the identification signal; and
a system interface, operable to:
compute the location of the mobile phone based on the detection responses received from the antenna control stations;
receive an approximate location of the mobile phone;
identify a number of antennas from a plurality of antennas based on the approximate location;
calculate an initial orientation for each of the identified antennas based on the approximate location; and
communicate the initial orientation for each of the identified antennas to the antenna control station associated with the particular identified antenna to be used to determine a starting orientation for the particular identified antenna.

12. The system of claim 11, wherein the detection response comprises an angular azimuth at which the associated antenna is able to detect the identification signal.

13. The system of claim 11, wherein the system interface is operable to:
receive location requests identifying an identification signal associated with the mobile phone from a plurality of mobile communication systems;
identify the mobile communication system that sent a particular location request; and
communicate the location of the mobile phone to the identified mobile communication system.

14. The system of claim 11, wherein computing the location comprises computing a latitude and a longitude.

15. The system of claim 11, wherein computing the location comprises generating directions for driving from a predetermined location to the location of the mobile phone.

16. The system of claim 11, wherein adjusting an orientation of the associated antenna comprises mechanically steering the associated antenna.

17. The system of claim 11, wherein adjusting an orientation of the associated antenna comprises electronically steering the associated antenna.

18. An apparatus for determining the location of a mobile phone, the apparatus comprising:
a system interface operable to:
receive a location request including an identification signal associated with a mobile phone and an approximate location of the mobile phone;
receive one or more detection responses, each detection response including an orientation at which a directional antenna detects the identification signal; and
determine a location of the mobile phone based on the detection responses;
identify one or more directional antennas from a plurality of directional antennas;
calculate an initial orientation for each of the identified directional antennas based on the approximate location of the mobile phone; and
communicate to each of the identified directional antennas the initial orientation calculated for that particular identified directional antenna.

19. The apparatus of claim 18, wherein the detection response comprises an angular azimuth.

20. The apparatus of claim 18, wherein:
one or more directional antennas comprises three directional antennas; and
determining a location comprises triangulating the location based on the location of each of the directional antennas and the orientation of each of the directional antennas.

21. The apparatus of claim 18, wherein the location request identifies one of a plurality of mobile communication networks, and the system interface is further operable to:
generate a location response the location of the mobile phone; and
communicate the location response to the identified mobile communication network.

22. The apparatus of claim 18, wherein the location response comprises a latitude and a longitude associated with the mobile phone.

23. The apparatus of claim 18, wherein the location response comprises directions for driving from a predetermined location to the location of the mobile phone.

24. An apparatus for determining the location of a mobile phone, comprising:

an antenna control station operable to:
receive a detection request identifying an identification signal associated with a mobile phone and comprising an initial orientation for a directional antenna;
set an orientation of the directional antenna based on the initial orientation;
direct the directional antenna to detect the identification signal;
determine an orientation of the directional antenna when the identification signal is detected; and
communicate the orientation to a system interface to be used in determining the location of the mobile phone.

25. The apparatus of claim 24, wherein the orientation comprises an angular azimuth.

26. The apparatus of claim 24, wherein directing a directional antenna comprises mechanically steering the directional antenna.

27. The apparatus of claim 24, wherein directing a directional antenna comprises electronically steering the directional antenna.

28. A method for determining the location of a mobile phone, comprising:

receiving a location request comprising an identification signal associated with a mobile phone and an approximate location of the mobile phone;
identifying one or more directional antennas from a plurality of directional antennas;
calculating an initial orientation for each of the identified directional antennas based on the approximate location of the mobile phone;
communicating to each of the identified directional antennas the initial orientation calculated for that particular identified directional antenna;
receiving one or more detection responses from one or more of the identified directional antennas, each detection response including an orientation at which a directional antenna detects the identification signal; and
determining a location of the mobile phone based on the detection responses.

29. The method of claim 28, wherein the orientation comprises an angular azimuth.

30. The method of claim 28, wherein:

one or more directional antennas comprises three directional antennas; and
determining a location comprises triangulating the location based on the location of each of the directional antennas and the orientation of each of the directional antennas.

31. The method of claim 28, wherein the location request identifies one of a plurality of mobile communication networks, and further comprising:

generating a location response including the location of the mobile phone; and
communicating the location response to the identified mobile communication network.

32. The method of claim 28, wherein the location response comprises a latitude and a longitude associated with the mobile phone.

33. The method of claim 28, wherein the location response comprises directions for driving from a predetermined location to the location of the mobile phone.

34. A computer program stored on a computer readable medium, the computer program operable to:

receive a location request from a mobile communication system, the location request including an identification signal associated with a mobile phone and an approximate location of the mobile phone;
receive one or more detection responses, each detection response including an orientation at which a directional antenna detects the identification signal;
determine a location of the mobile phone independent of the mobile communication system based on the detection responses;
identify one or more directional antennas from a plurality of directional antennas;
calculate an initial orientation for each of the identified directional antennas based on the approximate location of the mobile phone; and
communicate to each of the identified directional antennas the initial orientation calculated for that particular identified directional antenna.

35. The computer program of claim 34, wherein the orientation comprises an angular azimuth.

36. The computer program of claim 34, the computer program further operable to receive one or more detection responses by receiving three directional responses and to determine a location by triangulating the location based on the location of each of the directional antennas and the orientation of each of the directional antennas.

37. The computer program of claim 34, wherein the location request identifies one of a plurality of mobile communication networks, and further wherein the computer program is further operable to:

generate a location response including the location of the mobile phone; and
communicate the location response to the identified mobile communication network.

38. The computer program of claim 34, wherein the computer program is further operable to generate a location response by generating the location response comprising a latitude and a longitude associated with the mobile phone.

39. The computer program of claim 34, wherein the computer program is further operable to generate a location response by generating the location response comprising directions for driving from a predetermined location to the location of the mobile phone.

40. A computer program for determining the location of a mobile phone, the computer program operable to:

receive a detection request identifying an identification signal associated with a mobile phone, the detection request comprising an initial orientation for a directional antenna;
set an orientation of the directional antenna based on the initial orientation,
direct the directional antenna to detect the identification signal;
determine an orientation of the directional antenna when the identification signal is detected; and
communicate the orientation to a remote location for determining the location of the mobile phone.

41. The computer program of claim 40, wherein the computer program is further operable to communicate the orientation by communicating an angular azimuth.

42. The computer program of claim 40, wherein the computer program is further operable to direct a directional antenna by mechanically steering the directional antenna.

43. The computer program of claim 40, wherein the computer program is further operable to direct a directional antenna by electronically steering the directional antenna.

44. A computer program for determining the location of a mobile phone, the computer program operable to:
- receive a location request comprising an identification signal associated with a mobile phone and an approximate location of the mobile phone;
- identify one or more directional antennas from a plurality of directional antennas;
- calculate an initial orientation for each of the identified directional antennas based on the approximate location of the mobile phone;
- communicate to each of the identified directional antennas the initial orientation calculated for that particular identified directional antenna;
- receive one or more detection responses from one or more of the identified directional antennas, each detection response including an orientation at which a directional antenna detects the identification signal; and
- determine a location of the mobile phone based on the detection responses.

45. The computer program of claim 44, wherein the orientation comprises an angular azimuth.

46. The computer program of claim 44, wherein the computer program is further operable to receive one or more detection responses by receiving three directional responses and to determine a location by triangulating the location based on the location of each of the directional antennas and the orientation of each of the directional antennas.

47. The computer program of claim 44, the computer program further operable to receive the location request by receiving a location request identifying one of a plurality of mobile communication networks, and the computer program further operable to:
- generate a location response comprising the location of the mobile phone; and
- communicate the location response to the identified mobile communication network.

48. The computer program of claim 47, the computer program operable to generate the location response by generating a location response comprising a latitude and a longitude associated with the mobile phone.

49. The computer program of claim 47, the computer program operable to generate the location response by generating a location response comprising directions for driving from a predetermined location to the location of the mobile phone.

50. A system for determining the location of a mobile phone, comprising:
- means for receiving a location request from a mobile communication system, the location request including an identification signal associated with a mobile phone and an approximate location of the mobile phone;
- means for receiving one or more detection responses, each detection response including an orientation at which a directional antenna detects the identification signal;
- means for determining a location of the mobile phone independent of the mobile communication system based on the detection responses;
- means for identifying one or more directional antennas from a plurality of directional antennas;
- means for calculating an initial orientation for each of the identified directional antennas based on the approximate location of the mobile phone; and
- means for communicating to each of the identified directional antennas the initial orientation calculated for that particular identified directional antenna.

51. A system for determining the location of a mobile phone, comprising:
- means for receiving a detection request identifying an identification signal associated with a mobile phone, the detection request comprising an initial orientation for a directional antenna;
- means for setting an orientation of the directional antenna based on the initial orientation;
- means for directing the directional antenna to detect the identification signal;
- means for determining an orientation of the directional antenna when the identification signal is detected; and
- means for communicating the orientation to a remote location for determining the location of the mobile phone.

52. A system for determining the location of a mobile phone, comprising:
- means for receiving a location request comprising an identification signal associated with a mobile phone and an approximate location of the mobile phone;
- means for identifying one or more directional antennas from a plurality of directional antennas;
- means for calculating an initial orientation for each of the identified directional antennas based on the approximate location of the mobile phone;
- means for communicating to each of the identified directional antennas the initial orientation calculated for that particular identified directional antenna;
- means for receiving one or more detection responses from one or more of the identified directional antennas, each detection response including an orientation at which a directional antenna detects the identification signal; and
- means for determining a location of the mobile phone based on the detection responses.

* * * * *